US007974770B2

(12) United States Patent
Baumann et al.

(10) Patent No.: US 7,974,770 B2
(45) Date of Patent: Jul. 5, 2011

(54) ENGINE-CONTROLLING UNIT AND ENGINE-CONTROLLING METHOD FOR AN INTERNAL-COMBUSTION ENGINE

(75) Inventors: Thomas Baumann, Regensburg (DE); Nicole Fuhrmann, Lappersdorf (DE); Martin Jehle, Regensburg (DE); Michaela Schneider, Wiesenfelden (DE)

(73) Assignee: Continental Automotive GmbH, Hannover (DE)

( * ) Notice: Subject to any disclaimer, the term of this patent is extended or adjusted under 35 U.S.C. 154(b) by 381 days.

(21) Appl. No.: 12/355,054

(22) Filed: Jan. 16, 2009

(65) Prior Publication Data

US 2009/0198435 A1 Aug. 6, 2009

(30) Foreign Application Priority Data

Jan. 24, 2008 (DE) ........................ 10 2008 005 959

(51) Int. Cl.
*G06F 19/00* (2011.01)
*F01N 3/10* (2006.01)

(52) U.S. Cl. ............. 701/115; 701/103; 60/274; 60/285

(58) Field of Classification Search .................. 123/295, 123/305, 431, 443, 478, 480, 672, 674, 679, 123/688, 690; 701/101–105, 109, 114, 115; 60/274, 277, 285, 286, 299; 710/100, 107, 710/110
See application file for complete search history.

(56) References Cited

U.S. PATENT DOCUMENTS

| | | | | |
|---|---|---|---|---|
| 6,047,542 | A * | 4/2000 | Kinugasa et al. | 60/274 |
| 6,073,592 | A * | 6/2000 | Brown et al. | 123/27 GE |
| 6,522,030 | B1 * | 2/2003 | Wall et al. | 307/43 |
| 7,225,074 | B2 | 5/2007 | Jehle | 701/104 |
| 7,228,372 | B2 * | 6/2007 | Yoshimura et al. | 710/110 |
| 7,266,942 | B2 * | 9/2007 | Iihoshi et al. | 60/277 |
| 7,549,284 | B2 * | 6/2009 | Iihoshi et al. | 60/285 |
| 7,725,230 | B2 * | 5/2010 | Knoefler et al. | 701/48 |
| 2005/0166578 | A1 | 8/2005 | Pohmerer et al. | 60/285 |
| 2006/0200298 | A1 | 9/2006 | Jehle | 701/104 |

FOREIGN PATENT DOCUMENTS

| | | |
|---|---|---|
| DE | 102005010029 | 3/2005 |
| DE | 10220337 | 5/2005 |
| DE | 102006003487 | 1/2006 |

* cited by examiner

*Primary Examiner* — Willis R Wolfe, Jr.
(74) *Attorney, Agent, or Firm* — King & Spalding L.L.P.

(57) ABSTRACT

An engine-controlling unit/method for an internal-combustion engine with first and second combustion-chamber groups having a first and second catalytic exhaust-gas converter, respectively, having (a) a master control device that controls a combustion-air ratio for the first combustion-chamber group by forcibly exciting the first combustion-chamber group, further having (b) a slave control device that controls a combustion-air ratio for the second combustion-chamber group by forcibly exciting the second combustion-chamber group, and further having (c) a data link between the master and slave for control through the master. It is proposed (d) for the master to transmit a synchronizing signal to the slave over the data link during changeover between the rich and lean combustion-air ratio within the scope of forced excitation, and (e) on receipt of the synchronizing signal from the master for the slave to change over within the scope of forced excitation between the rich and lean combustion-air ratio.

22 Claims, 6 Drawing Sheets

ENGINE-CONTROLLING UNIT AND ENGINE-CONTROLLING METHOD FOR AN INTERNAL-COMBUSTION ENGINE

CROSS-REFERENCE TO RELATED APPLICATIONS

This application claims priority to DE Patent Application No. 10 2008 005 959.5 filed Jan. 24, 2008, the contents of which is incorporated herein by reference in its entirety.

TECHNICAL FIELD

The invention relates to an engine-controlling unit and a corresponding engine-controlling method for an internal-combustion engine having a plurality of combustion-chamber groups (cylinder lines) and a plurality of catalytic exhaust-gas converters, with said combustion-chamber groups each being individually forcibly excited through alternate setting of a lean combustion-air ratio and a rich combustion-air ratio.

BACKGROUND

With spark-ignition engines it is necessary particularly when linear lambda controlling is used to perform forced excitation for insuring optimal exhaust-gas conversion and for diagnostic purposes, with a rich combustion-air ratio and a lean combustion-air ratio being set alternately within the scope of forced exciting.

However, changing the combustion-air ratio within the scope of forced exciting results in a corresponding change in engine-drive torque, which in the case of internal-combustion engines having two cylinder lines is compensated through having forced exciting and hence also changing of the two cylinder lines' engine-drive torque take place in phase opposition.

It is furthermore known that in the case of internal-combustion engines having two cylinder lines the engine is controlled by means of a master-slave system, with a superordinate master control device controlling one cylinder line and a subordinate slave control device controlling the other cylinder line. Dividing engine controlling in that way between a master control device and a slave control device offers the possibility of individually calculating the parameters for forcibly exciting the two cylinder lines. Thus the master control device can calculate thresholds for the oxygen charge of the first combustion-chamber group's catalytic exhaust-gas converter while the slave control device calculates thresholds for the oxygen charge of the second cylinder line's catalytic exhaust-gas converter. The lambda deviation for the two cylinder lines' forced excitation can, moreover, also be calculated separately in the master control device and slave control device.

In the case of engine controlling of said kind by means of a master control device and a slave control device there is, however, as yet no known solution for enabling the individual cylinder lines to be forcibly excited in a mutually opposing manner for compensating variations in engine-drive torque during forced excitation.

SUMMARY

According to various embodiments, the known engine-controlling units or, as the case may be, engine-controlling methods having a master control device and a slave control device can be improved. It is in particular desirable for forced exciting to be performed in the case of said type of engine controlling in such a way that the change in drive torque in the two cylinder lines takes place in a mutually opposing manner.

According to an embodiment, an engine-controlling unit for an internal-combustion engine that has a first combustion-chamber group having a first catalytic exhaust-gas converter and that has a second combustion-chamber group having a second catalytic exhaust-gas converter, may have a) a master control device that controls a combustion-air ratio in the case of the first combustion-chamber group of the internal-combustion engine, with the master control device forcibly exciting the first combustion-chamber group through alternate setting of a lean combustion-air ratio and a rich combustion-air ratio in the first combustion-chamber group, b) a slave control device that controls a combustion-air ratio in the case of the second combustion-chamber group of the internal-combustion engine, with the slave control device forcibly exciting the second combustion-chamber group through the alternate setting of a lean combustion-air ratio and a rich combustion-air ratio in the second combustion-chamber group, c) a data link between the master control device and slave control device, with the master control device controlling the slave control device over the data link, wherein d) the master control device is operable to transmit a synchronizing signal to the slave control device over the data link during changeover between the rich combustion-air ratio and lean combustion-air ratio within the scope of forced excitation, and wherein e) on receipt of the synchronizing signal from the master control device the slave control device is operable to change over within the scope of forced excitation between the rich and lean combustion-air ratio.

According to a further embodiment, the master control device may be operable to transmit the synchronizing signal to the slave control device only when the master control device changes over between the lean combustion-air ratio and rich combustion-air ratio in a specific direction. According to a further embodiment, a) the slave control device may be operable to change over in a first direction between the rich combustion-air ratio and lean combustion-air ratio on receipt of the synchronizing signal from the master control device, and b) the slave control device may be operable to change over autonomously in an opposite second direction between the lean and rich combustion-air ratio and independently of the synchronizing signal. According to a further embodiment, a) the master control device may be operable to calculate the oxygen charge of the first catalytic exhaust-gas converter using a model, b) the master control device may be operable to compare the oxygen charge of the first catalytic exhaust-gas converter with a pre-defined threshold, c) the master control device may be operable to change over between the lean combustion-air ratio and rich combustion-air ratio if the comparison indicates that the oxygen charge of the first catalytic exhaust-gas converter has attained the threshold, d) the slave control device may be operable to calculate the oxygen charge of the second catalytic exhaust-gas converter using a model, e) the slave control device may be operable to compare the oxygen charge of the second catalytic exhaust-gas converter with a pre-defined threshold, and f) the slave control device may be operable to change over independently of the synchronizing signal between the lean combustion-air ratio and rich combustion-air ratio if the comparison indicates that the oxygen charge of the second catalytic exhaust-gas converter has attained the threshold. According to a further embodiment, the master control device and slave control device may be operable to calculate the thresholds for the oxygen charge mutually independently. According to a further embodiment, the master control device on the one hand and the slave control device on the other hand may be operable to change over between the rich combustion-air ratio and lean combustion-air ratio within the scope of forced excitation in phase opposition. According to a further embodiment, a) the master control device may be operable to transmit the synchronizing signal to the slave control device when the master control device changes over from a rich combustion-air ratio to a lean combustion-air ratio, or b) the master control device may be operable to transmit the synchronizing signal to the slave control device when the master control device changes over from a lean combustion-air ratio to a rich combustion-air ratio. According to a further embodiment, at least one of the following conditions a), b), and c) may be fulfilled: a) the data link between the master control device and slave control device has a data bus, b) the synchronizing signal is formed by means of a binary digital signal, and c) the synchronizing signal is an edge of the binary digital signal, with both a rising edge and a falling edge of the digital signal being a synchronizing signal. According to a further embodiment, a) during forced excitation the master control device may be operable to set at least one of the rich combustion-air ratio and lean combustion-air ratio having a specific lambda deviation, b) during forced excitation the slave control device may be operable to set at least one of the rich combustion-air ratio and lean combustion-air ratio having a specific lambda deviation, and wherein c) during forced excitation the master control device and slave control device may be operable to set the lambda deviation mutually independently. According to a further embodiment, a) the master control device may be operable to calculate a first lambda deviation for forcibly exciting the first combustion-chamber group, b) the slave control device may be operable to calculate a second lambda deviation for forcibly exciting the second combustion-chamber group, and c) the master control device and slave control device may be operable to align the first lambda deviation and second lambda deviation via the data link and determine a uniform lambda deviation for forcibly exciting both the first combustion-chamber group and second combustion-chamber group. According to a further embodiment, a) the master control device may be operable to calculate a first threshold for the oxygen charge of the first catalytic exhaust-gas converter, b) the slave control device may be operable to calculate a second threshold for the oxygen charge of the second catalytic exhaust-gas converter, and c) the master control device and slave control device may be operable to align the first threshold and second threshold via the data link and determine a uniform threshold for the oxygen charge of both the first catalytic exhaust-gas converter and the second catalytic exhaust-gas converter.

According to another embodiment, a motor vehicle may have an engine-controlling unit as described above.

According to yet another embodiment, an engine-controlling method for an internal-combustion engine that has a first combustion-chamber group having a first catalytic exhaust-gas converter and that has a second combustion-chamber group having a second catalytic exhaust-gas converter, may have the following steps: a) Forcibly exciting the first combustion-chamber group of an internal-combustion engine by means of a master control device through alternate setting by the master control device of at least one of a rich combustion-air ratio and a lean combustion-air ratio of the first combustion-chamber group, and b) forcibly exciting the second combustion-chamber group of an internal-combustion engine by means of a slave control device through alternate setting by the slave control device of at least one of a rich combustion-air ratio and a lean combustion-air ratio of the second combustion-chamber group, c) Synchronizing forced excitation of the first combustion-chamber group with forced excitation of the second combustion-chamber group.

According to a further embodiment, a) the master control device may transmit a synchronizing signal to the slave control device over the data link during changeover between the rich combustion-air ratio and lean combustion-air ratio within the scope of forced excitation, and b) on receipt of the synchronizing signal from the master control device the slave control device may change over within the scope of forced excitation between the rich combustion-air ratio and lean combustion-air ratio. According to a further embodiment, the master control device will transmit the synchronizing signal to the slave control device only when the master control device changes over between the lean combustion-air ratio and rich combustion-air ratio in a specific direction. According to a further embodiment, a) the slave control device may change over in a first direction between the rich combustion-air ratio and lean combustion-air ratio on receipt of the synchronizing signal from the master control device, and b) the slave control device may change over autonomously in an opposite second direction between the lean and rich combustion-air ratio and independently of the synchronizing signal. According to a further embodiment, a) the master control device may calculate the oxygen charge of the first catalytic exhaust-gas converter using a model, b) the master control device may compare the oxygen charge of the first catalytic exhaust-gas converter with a pre-defined threshold, c) the master control device will change over between the lean combustion-air ratio and rich combustion-air ratio if the comparison indicates that the oxygen charge of the first catalytic exhaust-gas converter has attained the threshold, d) the slave control device may calculate the oxygen charge of the second catalytic exhaust-gas converter using a model, e) the slave control device may compare the oxygen charge of the second catalytic exhaust-gas converter with a pre-defined threshold, and f) the slave control device will change over independently of the synchronizing signal between the lean combustion-air ratio and rich combustion-air ratio if the comparison indicates that the oxygen charge of the second catalytic exhaust-gas converter has attained the threshold. According to a further embodiment, the master control device and slave control device may calculate the thresholds for the oxygen charge mutually independently. According to a further embodiment, the master control device on the one hand and the slave control device on the other may change over between the rich combustion-air ratio and lean combustion-air ratio within the scope of forced excitation in phase opposition. According to a further embodiment, a) the master control device will transmit the synchronizing signal to the slave control device when the master control device changes over from a rich combustion-air ratio to a lean combustion-air ratio, or b) the master control device will transmit the synchronizing signal to the slave control device when the master control device changes over from a lean combustion-air ratio to a rich combustion-air ratio. According to a further embodiment, at least one of the following conditions may be fulfilled: a) the data link between the master control device and slave control device has a data bus, and b) the synchronizing signal is a binary digital signal. According to a further embodiment, a) during forced excitation the master control device may set at least one of the rich combustion-air ratio and lean combustion-air ratio having a specific lambda deviation, b) during forced excitation the slave control device may set at least one the rich combustion-air ratio and lean combustion-air ratio having a specific lambda deviation, and c) during forced excitation the master control device and slave control device may set the lambda deviation mutually independently.

BRIEF DESCRIPTION OF THE DRAWINGS

Other advantageous developments of the invention are described in more detail below with reference to exemplary embodiments with the aid of the figures.

DETAILED DESCRIPTION

Figure 1:
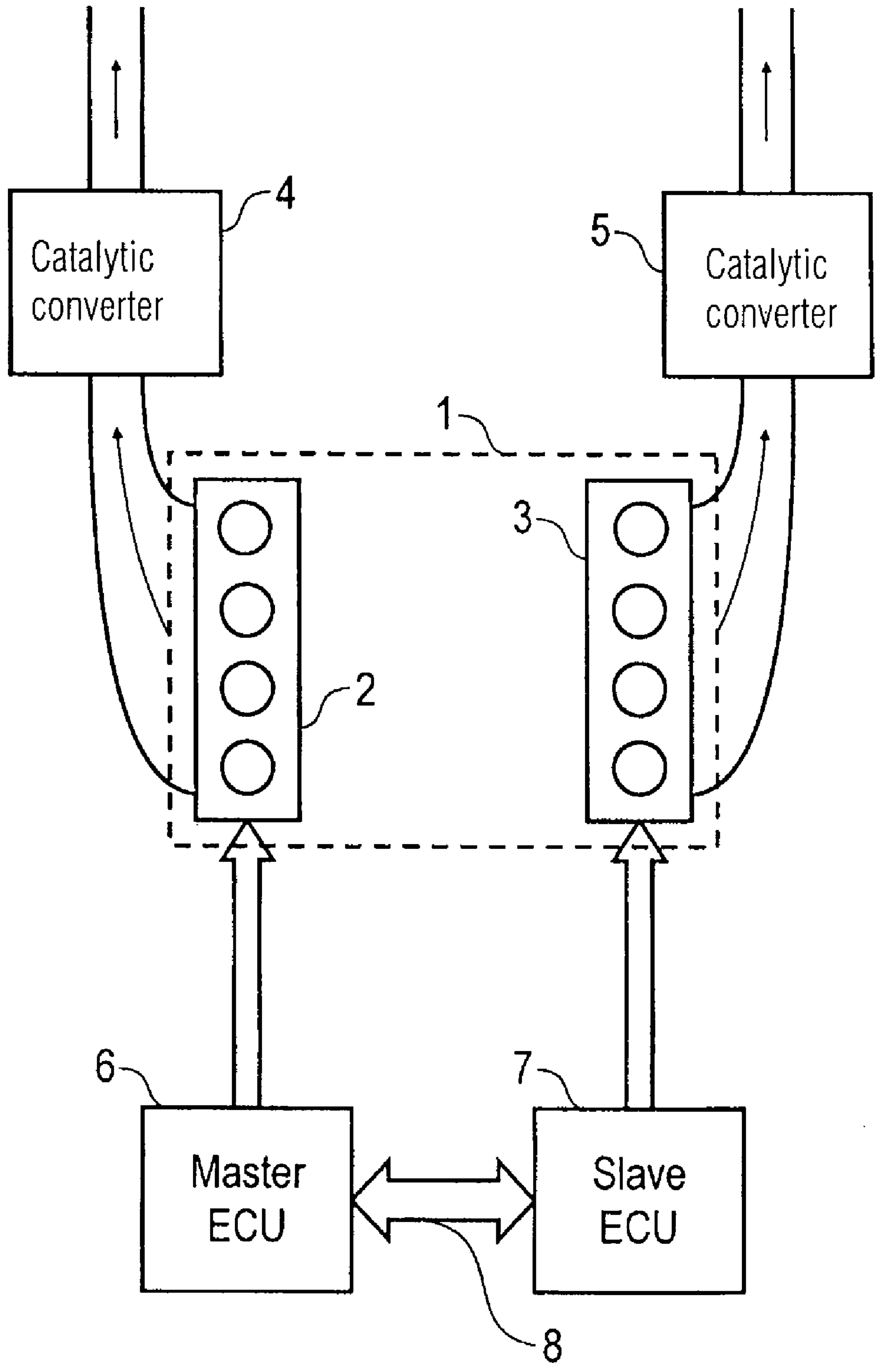
FIG. 1 is a schematic of a drive system for a motor vehicle that has an internal-combustion engine having two cylinder lines controlled respectively by a master control device and a slave control device.

The various embodiments encompass the general technical doctrine of synchronizing the first combustion-chamber group's forced excitation by the master control device with the second combustion-chamber group's forced excitation by the slave control device in order to achieve forced excitation that is in phase opposition and thereby compensate the variations in drive torque that are associated with forced excitation.

The engine-controlling unit according to various embodiments has a master control device that controls the combustion-air ratio in the case of the internal-combustion engine's first combustion-chamber group, with the master control device forcibly exciting the first combustion-chamber group through alternately setting a lean combustion-air ratio and a rich combustion-air ratio in the first combustion-chamber group. Since setting of the combustion-air ratio by the master control device can therein be performed in a conventional manner, it requires no further description.

The engine-controlling unit according to various embodiments furthermore has a slave control device that controls the combustion-air ratio in the case of the internal-combustion engine's second combustion-chamber group, with the slave control device forcibly exciting the second combustion-chamber group through alternately setting a lean combustion-air ratio and a rich combustion-air ratio in the second combustion-chamber group. The slave control device can also set the combustion-air ratio in a conventional manner so that the way in which the combustion-air ratio is set requires no further description.

Further provided in the case of the engine-controlling unit according to various embodiments is a data link between the master control device and slave control device, with the master control device controlling the slave control device over said data link.

The various embodiments provide for the master control device to transmit a synchronizing signal to the slave control device over the data link during changeover between the rich combustion-air ratio and lean combustion-air ratio within the scope of forced excitation.

On receiving the synchronizing signal from the master control device, the slave control device then changes over within the scope of forced excitation between the rich and lean combustion-air ratio.

In an exemplary embodiment the master control device does not send the synchronizing signal to the slave-control device each time changeover takes place between a lean combustion-air ratio and rich combustion-air ratio but only when the master control device changes over between the lean combustion-air ratio and rich combustion-air ratio in a specific direction (for example from lean to rich). So changeover between the lean combustion-air ratio and rich combustion-air ratio will be triggered in the slave control device by the master control device in one changeover direction only, whereas in the opposite changeover direction the slave control device will change over autonomously between the lean combustion-air ratio and rich combustion-air ratio.

It is, though, alternatively also possible within the inventive scope for the master control device to trigger both the slave control device's changeover operations (from rich to lean and from lean to rich) by means of the synchronizing signal.

In an exemplary embodiment the master control device calculates the oxygen charge of the first catalytic exhaust-gas converter, which is assigned to the first combustion-chamber group, using a model, something that is known per se from the prior art and so requires no further description. The master control device then compares the first catalytic exhaust-gas converter's oxygen charge with a pre-defined threshold. The master control device will within the scope of forced excitation change over between the lean combustion-air ratio and rich combustion-air ratio if comparing the ascertained oxygen charge with the threshold indicates that the first catalytic exhaust-gas converter's oxygen charge has attained the threshold.

The slave control device therein calculates the oxygen charge of the second catalytic exhaust-gas converter, which is assigned to the internal-combustion engine's second combustion-chamber group, using a model. The slave control device then compares the second catalytic exhaust-gas converter's ascertained oxygen charge with a pre-defined threshold. The slave control device will within the scope of forced excitation change over between the lean combustion-air ratio and rich combustion-air ratio regardless of receiving the synchronizing signal from the master control device if the comparison indicates that the second catalytic exhaust-gas converter's oxygen charge has attained the threshold. One changeover operation will therein be triggered in the slave control device, meaning by the master control device, by the synchronizing signal, while the other changeover operation will be triggered in the slave control device if the oxygen charge attains the threshold.

It is possible within the inventive scope for the master control device and slave control device to calculate the thresholds for the oxygen charge mutually independently, which may result in different thresholds.

It was already mentioned above that within the scope of forced excitation the master control device on the one hand and the slave control device on the other change over between the rich combustion-air ratio and lean combustion-air ratio preferably in phase opposition. The term "in phase opposition" does not, though, within the inventive scope mean that changing over between the lean combustion-air ratio and rich combustion-air ratio takes place exactly simultaneously in the slave control device on the one hand and the master control device on the other. It is decisive only for phase displacement between forced excitations of the master control device and slave control device to result in at least partial compensating of the variations in drive torque that are caused by forced excitation.

The master control device will according to an embodiment transmit the synchronizing signal to the slave-control device when the master control device changes over within the scope of forced excitation from a rich combustion-air ratio to a lean combustion-air ratio.

It is, though, alternatively also possible for the master control device to transmit the synchronizing signal to the slave control device when the master control device changes over within the scope of forced excitation from a lean combustion-air ratio to a rich combustion-air ratio.

Further to be mentioned is that the data link between the master control device and slave control device is formed preferably by means of a data bus, something that is known per se from the prior art and so requires no further description. The synchronizing signal can therein be a binary digital signal such as, for example, what is termed a toggle bit.

The rich combustion-air ratio and/or lean combustion-air ratio are/is within the scope of forced excitation set having a specific lambda deviation compared with a mean combustion-air ratio. The master control device and slave control device can therein set the lambda deviation for forced excitation mutually independently. That means that the first combustion-chamber group can be forcibly excited with a lambda deviation different from that with which the second combustion-chamber group is forcibly excited.

In a preferred exemplary embodiment the master control device calculates a first lambda deviation for forcibly exciting the first combustion-chamber groups while the slave control device calculates a second lambda deviation for forcibly exciting the second combustion-chamber group. The master control device and slave control device then align the two calculated lambda deviations via the data link and determine a uniform lambda deviation for forcibly exciting both the first combustion-chamber group and second combustion-chamber group. Said aligning insures that both combustion-chamber groups will require the same period for a rich-lean cycle during forced excitation. The slave control device will then have completed its rich-lean cycle approximately at the instant at which it receives the next synchronizing signal from the master control device. The synchronizing signal therein preferably establishes the start of the individual rich-lean cycles and serves to make fine adjustments.

In order to achieve as good as possible phase opposition during forced exciting of the master control device on the one hand and slave control device on the other, despite delays in transmitting the synchronizing signal from the master control device to the slave control device, there can additionally be on the master control device a time-delay element that delays change-over between the rich combustion-air ratio and lean combustion-air ratio within the scope of forced excitation by a pre-defined time needed for transmitting the synchronizing signal from the master control device to the slave control device.

The master control device on the one hand and the slave control device on the other can furthermore also calculate thresholds for the respective catalytic exhaust-gas converters' oxygen charge mutually independently. The master control device and slave control device preferably align the calculated thresholds via the data link and determine a uniform threshold for both the first catalytic exhaust-gas converter's and the second catalytic exhaust-gas converter's oxygen charge.

Further to be mentioned is that the invention is not restricted to an internal-combustion engine having two combustion-chamber groups each driven by a control device, being a master control device and a slave control device. In the case of an internal-combustion engine having twelve cylinders, the cylinders can be arranged in, for example, four cylinder lines driven by two control devices.

The invention is furthermore not restricted to the above-described engine-controlling unit as the only component. Rather it is the case that the invention also encompasses a drive system as well as a motor vehicle having an engine-controlling unit of said type.

The invention finally also encompasses a corresponding engine-controlling method, as already proceeds from the above description and so does not need describing further.

FIG. 1 is a highly simplified schematic of a drive system for a motor vehicle that has an internal-combustion engine 1 having two cylinder lines 2, 3, with the two cylinder lines 2, 3 each being assigned a catalytic exhaust-gas converter respectively 4, 5.

The cylinder line 2 is therein driven by a master control device 6 (ECU: Electronic Control Unit), while the cylinder line 3 is controlled by a slave control device 7.

The master control device 6 is therein superordinate to the slave control device 7 and controls the operation of the slave control device 7 via a data bus 8 that links the master control device 6 to the slave control device 7.

The drive system furthermore in practice has further components (for example lambda probes, air-mass sensors, etc.) which, however, are not required for explaining the invention and so are not shown, either, for simplicity's sake.

Forced excitation according to various embodiments will now be described below with reference to FIG. 2.

At an instant t1 the master control device 6 sends a synchronizing signal to the slave control device 7 over the data link 8. What is therein sent is an edge of a binary signal S. At the instant t1 the master control device 6 then changes over, while the first cylinder line 2 is being driven, from a lean combustion-air ratio to a rich combustion-air ratio.

On receipt of the synchronizing signal from the master control device 6 the slave control device 7 then changes over conversely from a rich combustion-air ratio to a lean combustion-air ratio. Changeover from the rich combustion-air ratio to the lean combustion-air ratio is therefore triggered in the slave control device 7 by the master control device 6.

The master control device 6 then ascertains at an instant t2 that the oxygen charge of the catalytic exhaust-gas converter 4 of the first cylinder line 2 has dropped sufficiently again owing to interim rich driving, whereupon at the instant t2 the master control device 6 changes over again from a rich combustion-air ratio to a lean combustion-air ratio.

However, the slave control device 7 does not necessarily change over again yet at the instant t2 from a lean combustion-air ratio to a rich combustion-air ratio because the changeover operation in that direction is not triggered by the master control device 6. Rather it is the case that the slave control device 7 ascertains independently whether the oxygen charge of the catalytic exhaust-gas converter 5 of the second cylinder line 3 has risen to a threshold owing to interim lean driving. If it has, the slave control device 7 will at the instant t3 change over from the lean combustion-air ratio to the rich combustion-air ratio.

The master control device 6 then at the instant t4 again sends a synchronizing signal in the form of an edge of the binary signal S to the slave control device 7, as a result of which the above-described rich-lean cycle will be repeated within the scope of forced excitation. It is to be noted in this connection that each edge of the binary signal S, meaning both a rising edge as at the instant t1 and a falling edge as at the instant t4, constitutes a synchronizing signal. The binary signal S is therefore a toggle signal.

Figure 3A:
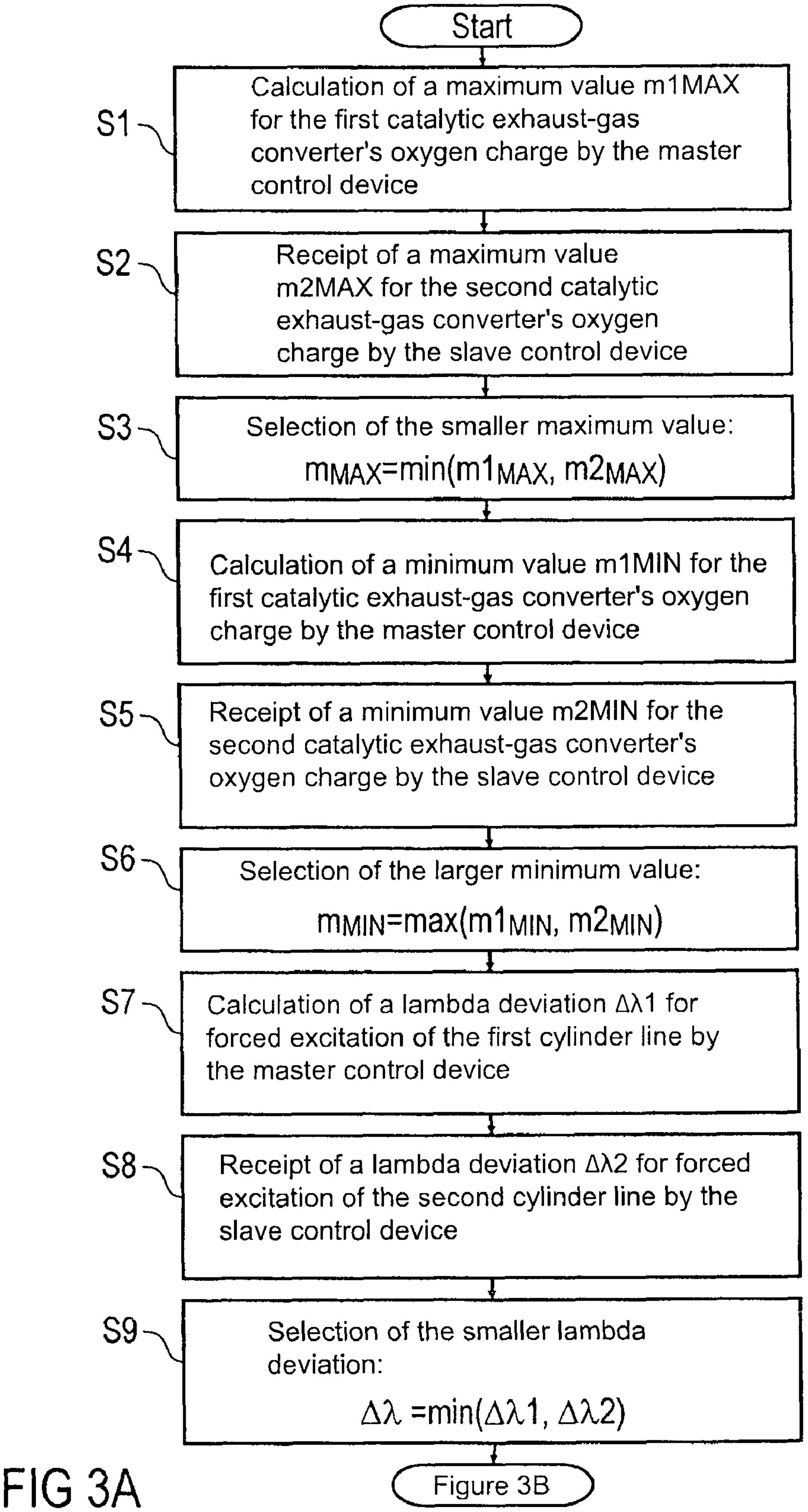
FIGS. 3A and 3B show an engine-controlling method according to an embodiment, where implemented in the master control device, in the form of a flowchart.

The engine-controlling method according to various embodiments, where implemented in the master control device 6, is first described below with reference to FIGS. 3A and 3B.

At a first step S1 the master control device 6 first calculates a maximum value $\mathbf{m1}_{max}$ for the oxygen charge of the catalytic exhaust-gas converter 4, which can be done in a conventional manner so requires no further description.

At a second step S2 the master control device 6 then receives a maximum value $\mathbf{m2}_{max}$ for the oxygen charge of the catalytic exhaust-gas converter 5 from the slave control device 7 via the data bus 8, with its being possible to calculate the maximum value $\mathbf{m2}_{max}$ in a conventional manner in the slave control device 7.

At a further step S3 the master control device 6 then selects the smaller of the two maximum values $\mathbf{m1}_{max}$ and $\mathbf{m2}_{max}$ and specifies it as being the uniform maximum value $m_{max}$ for the oxygen charge of the two catalytic exhaust-gas converters 4, 5.

A minimum value $\mathbf{m1}_{min}$ for the oxygen charge of the catalytic exhaust-gas converter 4 is then calculated by the master control device 6 at a step S4, which again can be done in a conventional manner.

At a further step S5 the master control device 6 then receives a minimum value $\mathbf{m2}_{min}$ for the oxygen charge of the catalytic exhaust-gas converter 5 from the slave control device 7 via the data bus 8, with its being possible likewise to calculate the minimum value $\mathbf{m2}_{min}$ in a conventional manner in the slave control device 7.

The master control device 6 then selects the larger of the two minimum values $\mathbf{m1}_{min}$ and $\mathbf{m2}_{min}$ and specifies it as being the uniform minimum value $m_{min}$ for the oxygen charge of the two catalytic exhaust-gas converters 4, 5.

The master control device 6 furthermore at a step S7 calculates a lambda deviation Δλ1 for forced exciting of the first cylinder line 2 by the master control device 6, which again can be done in a conventional manner and so requires no further description.

At a step S8 the master control device 6 then receives a lambda deviation Δλ2 for forced exciting of the cylinder line 3 from the slave control device 7 via the data bus 8, with its being possible for the lambda deviation Δλ2 to be calculated in a conventional manner by the slave control device 7.

The master control device S9 finally selects the smaller of the two lambda deviations Δλ1 and Δλ2 and specifies it as being the uniform lambda deviation Δλ for forced exciting of the two cylinder lines 2, 3.

The master control device 7 then at a step S10 ascertains an oxygen charge $\mathbf{m1}_{O2}$ of the catalytic exhaust-gas converter 4 in a conventional manner using a model.

The ascertained oxygen charge $\mathbf{m1}_{O2}$ is then at a step S11 compared by the master control device 6 with the maximum value $m_{max}$.

If the comparison performed at step S11 indicates that the maximum value $m_{max}$ has not yet been attained, the master control device 6 will keep repeating step S10 and ascertain the oxygen charge $\mathbf{m1}_{O2}$ of the catalytic exhaust-gas converter 4.

If, though, the comparison performed at step S11 indicates that a threshold has been exceeded, the master control device 6 will at step S12 send a synchronizing signal to the slave control device 7.

Figure 2:
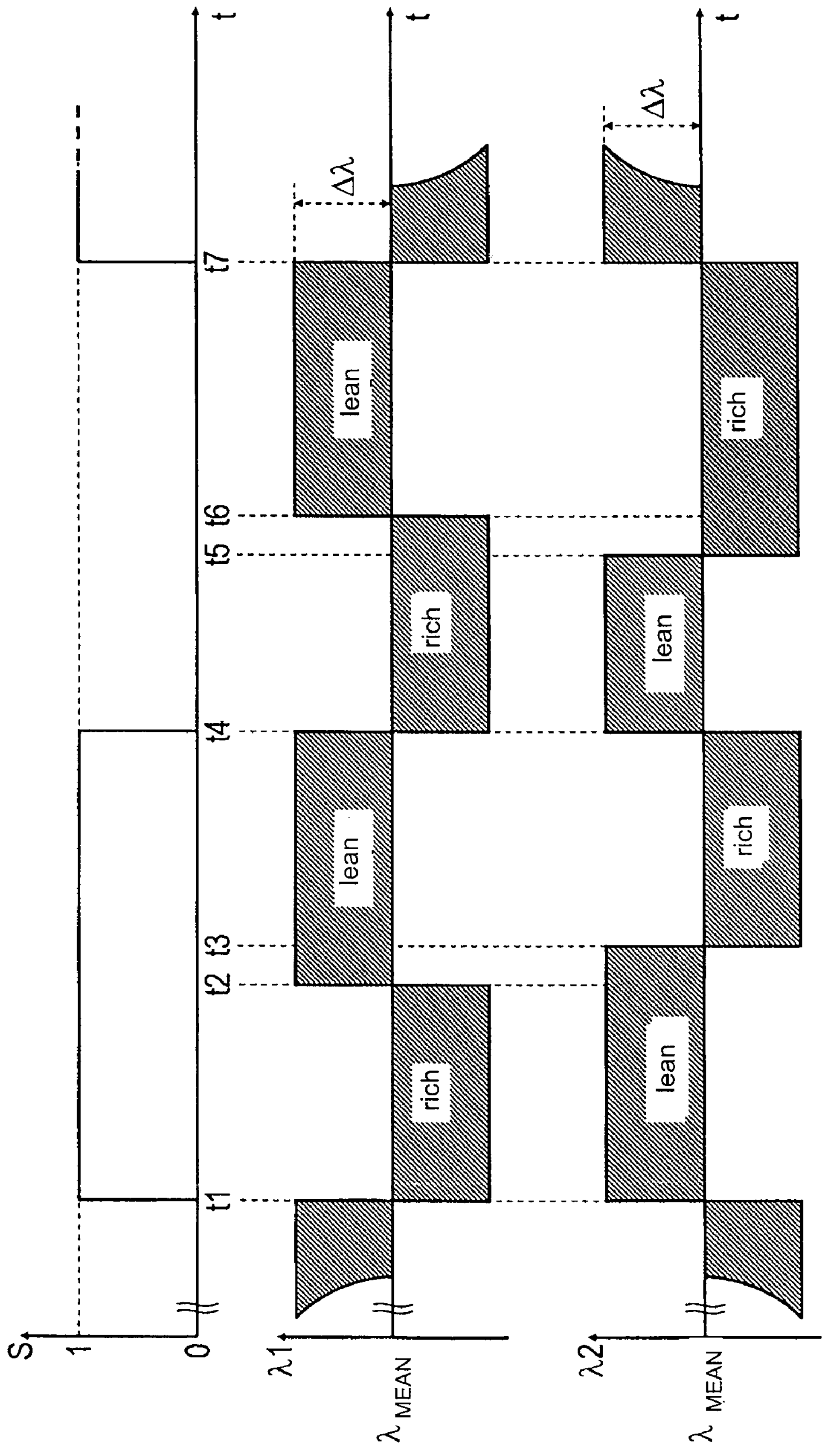
FIG. 2 shows timing diagrams of the synchronizing signal that is transmitted from the master control device to the slave control device and the associated curves of the two cylinder lines' combustion-air ratio.

The master control device 6 furthermore at a step S13 then changes over from the lean combustion-air ratio to a rich combustion-air ratio of the first cylinder line 2, which in the diagram in FIG. 2 corresponds to the instant t1.

The master control device 6 then again continuously ascertains the oxygen charge $\mathbf{m1}_{O2}$ of the catalytic exhaust-gas converter 4, with the master control device 6 continuously checking whether the oxygen charge $\mathbf{m1}_{O2}$ has fallen below the pre-defined, uniform minimum value $m_{min}$.

If it has not, the master control device 6 will repeat step S14 and continuously ascertain the current oxygen charge $\mathbf{m1}_{O2}$ of the catalytic exhaust-gas converter 4.

If, conversely, the comparison performed at step S15 indicates that a threshold has been exceeded, the master control device will change over the cylinder line 2 from a rich combustion-air ratio to a lean combustion-air ratio, which in the diagram in FIG. 2 corresponds to the instant t2.

Figure 3B:
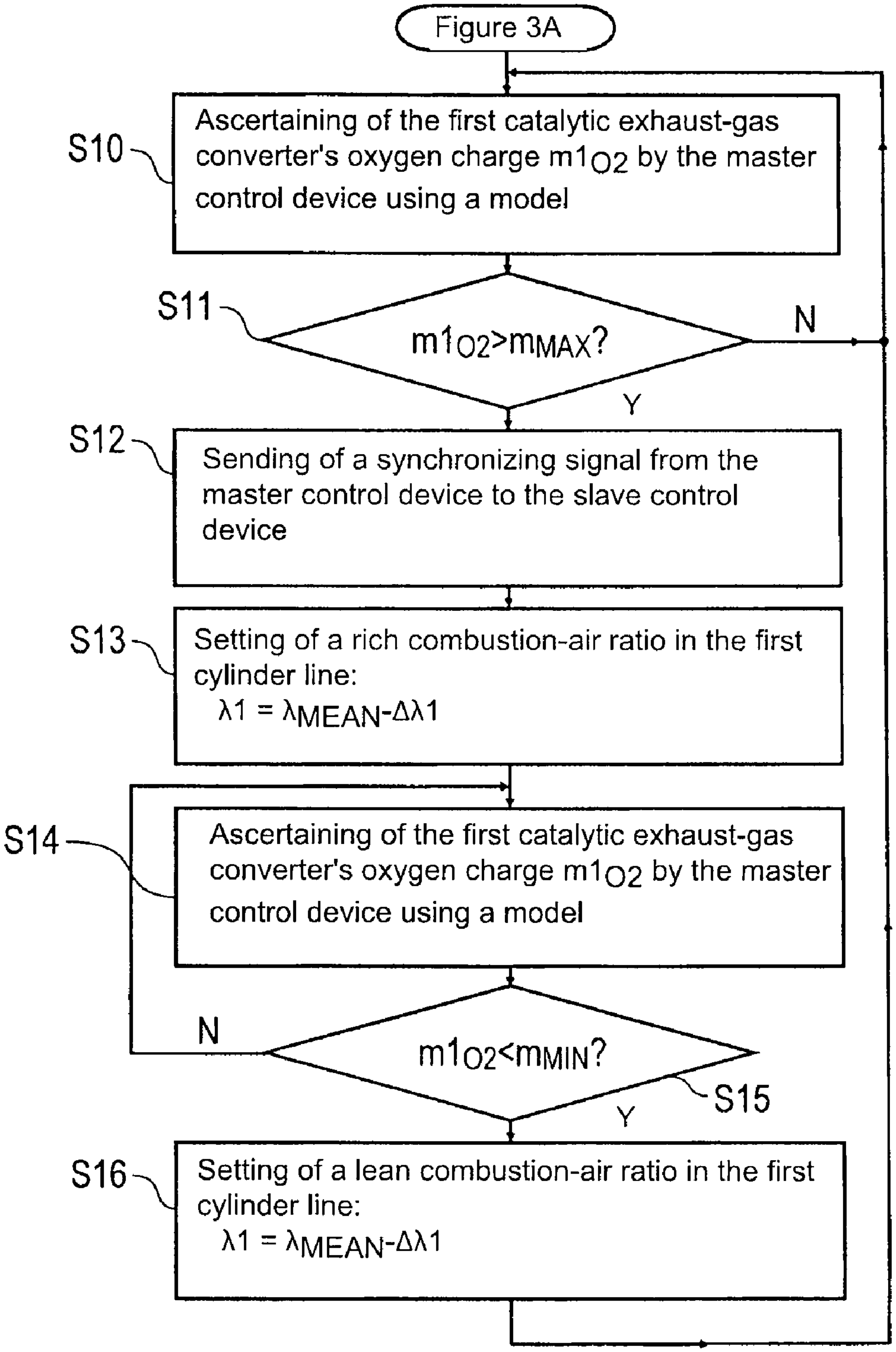

The master control device 6 then keeps repeating the lean-rich cycle shown in FIG. 3B for as long as forced excitation is to take place.

Figure 4A:
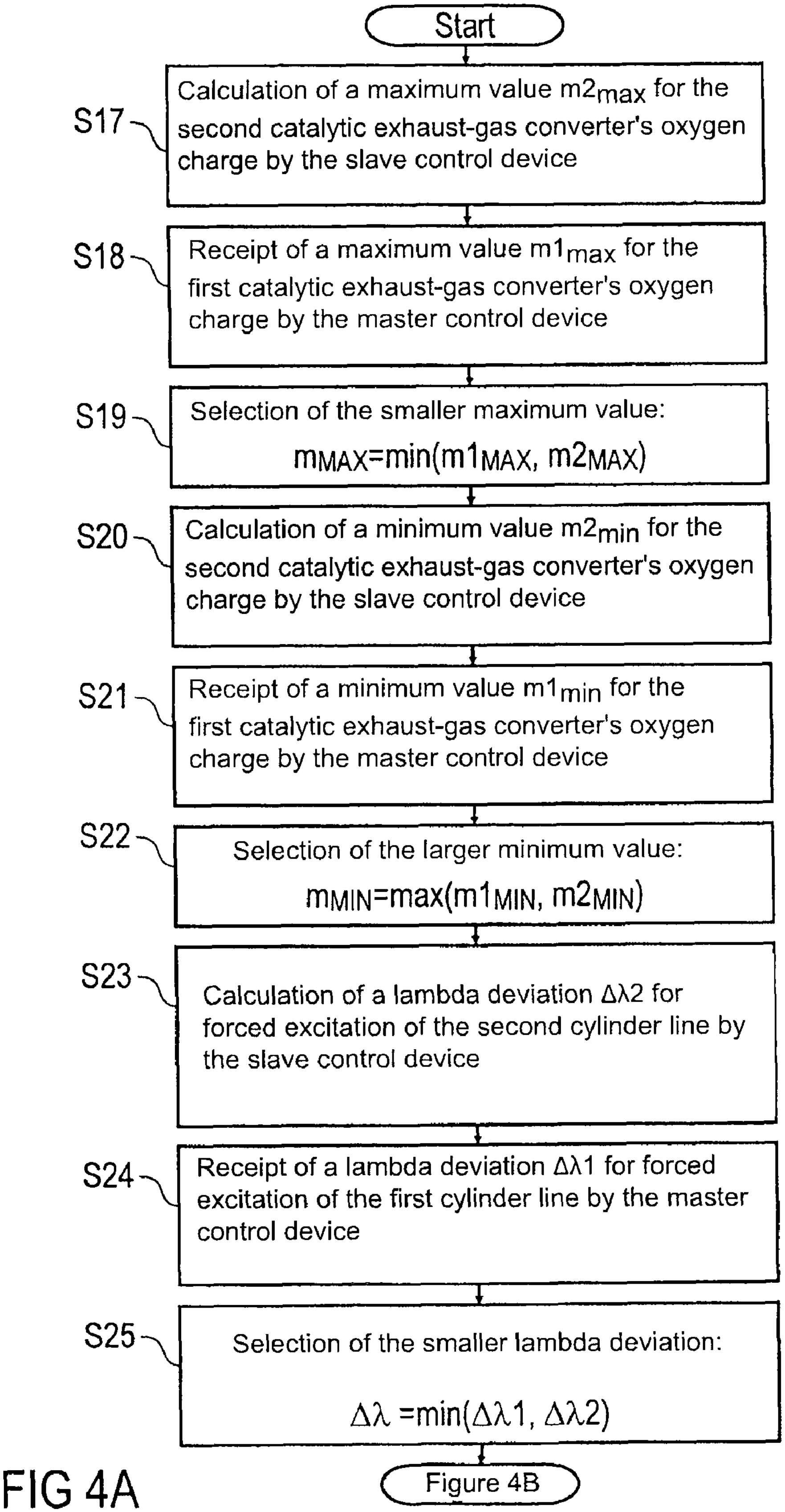
FIGS. 4A and 4B show an engine-controlling method according to an embodiment, where implemented in the slave control device, in the form of a flowchart.

The engine-controlling method according to various embodiments, where implemented in the slave control device 7, is now described below with reference to FIGS. 4A and 4B.

Since the engine-controlling method therein corresponds largely to the engine-controlling method described in FIGS. 3A and 3B that is implemented in the master control device 6, just a brief description is given below and only the differences between operating the slave control device 7 and operating the master control device 6 are described in more detail.

Thus steps S17-S25 of the engine-controlling method implemented in the slave control device 7 mirror steps S1-S9 of the engine-controlling method implemented in the master control device 6.

At a step S26 the slave control device 7 then waits for a synchronizing signal to be received from the master control device 6 via the data bus 8.

If the check for the synchronizing signal performed at step S27 then indicates that the synchronizing signal has been received, the slave control device 7 will, while the first cylinder line 3 is being driven, change over at step S28 from a rich combustion-air ratio to a lean combustion-air ratio, which in the timing diagram shown in FIG. 2 is the case at the instant t1.

The slave control device 7 then at a step S29 continuously ascertains the oxygen charge $\mathbf{m2}_{O2}$ of the catalytic exhaust-gas converter 5 in a conventional manner.

At a step S30 the slave control device 7 then checks whether the ascertained oxygen charge $\mathbf{m2}_{O2}$ has exceeded the threshold $m_{max}$ for the oxygen charge.

If it has, the slave control device 7 will, while the first cylinder line 3 is being driven, change over at step S31 from a lean combustion-air ratio to a rich combustion-air ratio, which in the timing diagram shown in FIG. 2 is the case at the instant t3.

Figure 4B:
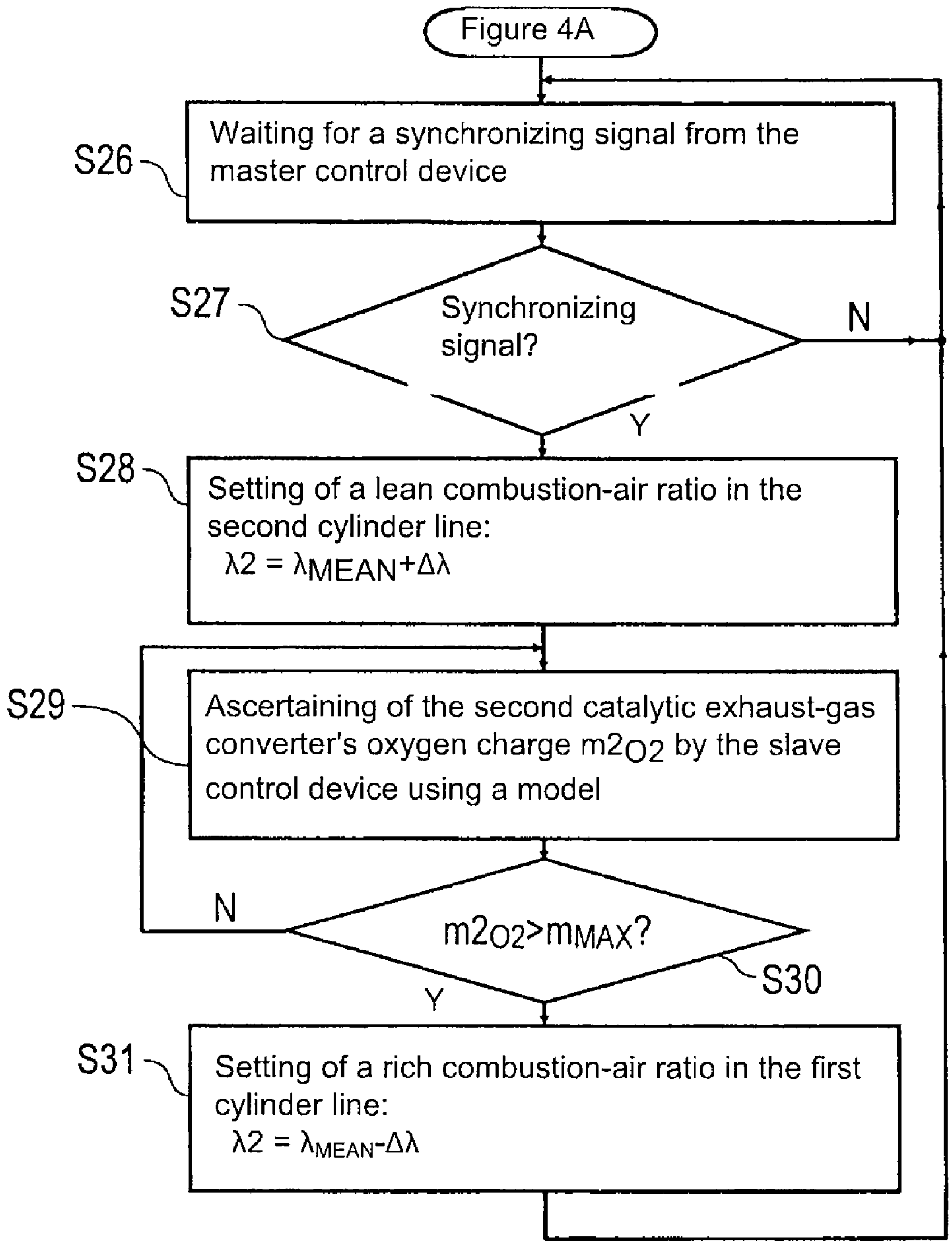

The slave control device 7 will then repeat the rich-lean cycle shown in FIG. 4B for as long as forced excitation is to take place.

The invention is not restricted to the above exemplary embodiment. Rather it is the case that a multiplicity of variants and modifications are possible that likewise utilize the inventive notion and so are encompassed within the scope of protection.

What is claimed is:

1. An engine-controlling unit for an internal-combustion engine that has a first combustion-chamber group having a first catalytic exhaust-gas converter and that has a second combustion-chamber group having a second catalytic exhaust-gas converter, having a) a master control device that controls a combustion-air ratio in the case of the first combustion-chamber group of the internal-combustion engine, with the master control device forcibly exciting the first combustion-chamber group through alternate setting of a lean combustion-air ratio and a rich combustion-air ratio in the first combustion-chamber group, b) a slave control device that controls a combustion-air ratio in the case of the second combustion-chamber group of the internal-combustion engine, with the slave control device forcibly exciting the second combustion-chamber group through the alternate setting of a lean combustion-air ratio and a rich combustion-air ratio in the second combustion-chamber group, c) a data link between the master control device and slave control device, with the master control device controlling the slave control device over the data link, wherein d) the master control device is operable to transmit a synchronizing signal to the slave control device over the data link during changeover between the rich combustion-air ratio and lean combustion-air ratio within the scope of forced excitation, and wherein e) on receipt of the synchronizing signal from the master control device the slave control device is operable to change over within the scope of forced excitation between the rich and lean combustion-air ratio.

2. The engine-controlling unit according to claim 1, wherein the master control device is operable to transmit the synchronizing signal to the slave control device only when the master control device changes over between the lean combustion-air ratio and rich combustion-air ratio in a specific direction.

3. The engine-controlling unit according to claim 1, wherein the master control device on the one hand and the slave control device on the other hand are operable to change over between the rich combustion-air ratio and lean combustion-air ratio within the scope of forced excitation in phase opposition.

4. The engine-controlling unit according to claim 1, wherein a) the master control device is operable to transmit the synchronizing signal to the slave control device when the master control device changes over from a rich combustion-air ratio to a lean combustion-air ratio, or wherein b) the master control device is operable to transmit the synchronizing signal to the slave control device when the master control device changes over from a lean combustion-air ratio to a rich combustion-air ratio.

5. The engine-controlling unit according to claim 1, wherein a) during forced excitation the master control device is operable to set at least one of the rich combustion-air ratio and lean combustion-air ratio having a specific lambda deviation, b) during forced excitation the slave control device is operable to set at least one of the rich combustion-air ratio and lean combustion-air ratio having a specific lambda deviation, and wherein c) during forced excitation the master control device and slave control device are operable to set the lambda deviation mutually independently.

6. The engine-controlling unit according to claim 1, wherein a) the master control device is operable to calculate a first threshold for the oxygen charge of the first catalytic exhaust-gas converter, b) the slave control device is operable to calculate a second threshold for the oxygen charge of the second catalytic exhaust-gas converter, and wherein c) the master control device and slave control device are operable to align the first threshold and second threshold via the data link and determine a uniform threshold for the oxygen charge of both the first catalytic exhaust-gas converter and the second catalytic exhaust-gas converter.

7. A motor vehicle having an engine-controlling unit according to claim 1.

8. The engine-controlling unit according to claim 1, wherein at least one of the following conditions a), b), and c) is fulfilled:

a) the data link between the master control device and slave control device has a data bus, b) the synchronizing signal is formed by means of a binary digital signal, and c) the synchronizing signal is an edge of the binary digital signal, with both a rising edge and a falling edge of the digital signal being a synchronizing signal.

9. The engine-controlling unit according to claim 8, wherein a) the master control device is operable to calculate a first lambda deviation for forcibly exciting the first combustion-chamber group, b) the slave control device is operable to calculate a second lambda deviation for forcibly exciting the second combustion-chamber group, and wherein c) the master control device and slave control device are operable to align the first lambda deviation and second lambda deviation via the data link and determine a uniform lambda deviation for forcibly exciting both the first combustion-chamber group and second combustion-chamber group.

10. The engine-controlling unit according to claim 1, wherein a) the slave control device is operable to change over in a first direction between the rich combustion-air ratio and lean combustion-air ratio on receipt of the synchronizing signal from the master control device, and wherein b) the slave control device is operable to change over autonomously in an opposite second direction between the lean and rich combustion-air ratio and independently of the synchronizing signal.

11. The engine-controlling unit according to claim 10, wherein a) the master control device is operable to calculate the oxygen charge of the first catalytic exhaust-gas converter using a model, b) the master control device is operable to compare the oxygen charge of the first catalytic exhaust-gas converter with a pre-defined threshold, c) the master control device is operable to change over between the lean combustion-air ratio and rich combustion-air ratio if the comparison indicates that the oxygen charge of the first catalytic exhaust-gas converter has attained the threshold, d) the slave control device is operable to calculate the oxygen charge of the second catalytic exhaust-gas converter using a model, e) the slave control device is operable to compare the oxygen charge of the second catalytic exhaust-gas converter with a pre-defined threshold, and wherein f) the slave control device is operable to change over independently of the synchronizing signal between the lean combustion-air ratio and rich combustion-air ratio if the comparison indicates that the oxygen charge of the second catalytic exhaust-gas converter has attained the threshold.

12. The engine-controlling unit according to claim 11, wherein the master control device and slave control device are operable to calculate the thresholds for the oxygen charge mutually independently.

13. An engine-controlling method for an internal-combustion engine that has a first combustion-chamber group having a first catalytic exhaust-gas converter and that has a second combustion-chamber group having a second catalytic exhaust-gas converter, having the following steps:

a) forcibly exciting the first combustion-chamber group of an internal-combustion engine by means of a master control device through alternate setting by the master control device of at least one of a rich combustion-air ratio and a lean combustion-air ratio of the first combustion-chamber group, and b) forcibly exciting the second combustion-chamber group of an internal-combustion engine by means of a slave control device through alternate setting by the slave control device of at least one of a rich combustion-air ratio and a lean combustion-air ratio of the second combustion-chamber group, c) synchronizing forced excitation of the first combustion-chamber group with forced excitation of the second combustion-chamber group.

14. The engine-controlling method according to claim 13, wherein a) the master control device will transmit the synchronizing signal to the slave control device when the master control device changes over from a rich combustion-air ratio to a lean combustion-air ratio, or wherein b) the master control device will transmit the synchronizing signal to the slave control device when the master control device changes over from a lean combustion-air ratio to a rich combustion-air ratio.

15. The engine-controlling method according to claim 13, wherein at least one of the following conditions is fulfilled:

a) the data link between the master control device and slave control device has a data bus, and b) the synchronizing signal is a binary digital signal.

16. The engine-controlling method according to claim 13, wherein a) during forced excitation the master control device sets at least one of the rich combustion-air ratio and lean combustion-air ratio having a specific lambda deviation, b) during forced excitation the slave control device sets at least one the rich combustion-air ratio and lean combustion-air ratio having a specific lambda deviation, and wherein c) during forced excitation the master control device and slave control device set the lambda deviation mutually independently.

17. The engine-controlling method according to claim 13, wherein a) the master control device transmits a synchronizing signal to the slave control device over the data link during changeover between the rich combustion-air ratio and lean combustion-air ratio within the scope of forced excitation, and wherein b) on receipt of the synchronizing signal from the master control device the slave control device changes over within the scope of forced excitation between the rich combustion-air ratio and lean combustion-air ratio.

18. The engine-controlling method according to claim 17, wherein the master control device will transmit the synchronizing signal to the slave control device only when the master control device changes over between the lean combustion-air ratio and rich combustion-air ratio in a specific direction.

19. The engine-controlling method according to claim 17, wherein the master control device on the one hand and the slave control device on the other change over between the rich combustion-air ratio and lean combustion-air ratio within the scope of forced excitation in phase opposition.

20. The engine-controlling method according to claim 17, wherein a) the slave control device changes over in a first direction between the rich combustion-air ratio and lean combustion-air ratio on receipt of the synchronizing signal from the master control device, and wherein b) the slave control device changes over autonomously in an opposite second direction between the lean and rich combustion-air ratio and independently of the synchronizing signal.

21. The engine-controlling method according to claim 20, wherein a) the master control device calculates the oxygen charge of the first catalytic exhaust-gas converter using a model, b) the master control device compares the oxygen charge of the first catalytic exhaust-gas converter with a pre-defined threshold, c) the master control device will change over between the lean combustion-air ratio and rich combustion-air ratio if the comparison indicates that the oxygen charge of the first catalytic exhaust-gas converter has attained the threshold, d) the slave control device calculates the oxygen charge of the second catalytic exhaust-gas converter using a model, e) the slave control device compares the oxygen charge of the second catalytic exhaust-gas converter with a predefined threshold, and wherein f) the slave control device will change over independently of the synchronizing signal between the lean combustion-air ratio and rich combustion-air ratio if the comparison indicates that the oxygen charge of the second catalytic exhaust-gas converter has attained the threshold.

22. The engine-controlling method according to claim 21, wherein the master control device and slave control device calculate the thresholds for the oxygen charge mutually independently.

* * * * *